United States Patent [19]

Matsunaga

[11] Patent Number: 4,757,411
[45] Date of Patent: Jul. 12, 1988

[54] MAGNETIC HEAD DEVICE HAVING A HOLDER WITH A GENERALLY RING SHAPE WHICH IS ELECTROMAGNETICALLY OPEN

[75] Inventor: Hiroshi Matsunaga, Tokyo, Japan

[73] Assignee: TEAC Corporation, Japan

[21] Appl. No.: 930,125

[22] Filed: Nov. 12, 1986

[30] Foreign Application Priority Data

Nov. 18, 1985 [JP] Japan .................................. 60-257960

[51] Int. Cl.⁴ ............................................... G11B 5/11
[52] U.S. Cl. .................................................... 360/129
[58] Field of Search ................ 360/129, 128, 124, 110

[56] References Cited

U.S. PATENT DOCUMENTS

| | | | |
|---|---|---|---|
| 3,610,839 | 10/1971 | Sand | 360/129 |
| 3,938,193 | 2/1976 | Sargunar | 360/128 |
| 4,405,961 | 9/1983 | Chow et al. | 360/129 |

Primary Examiner—John H. Wolff
Assistant Examiner—Matthew J. Bussan
Attorney, Agent, or Firm—Andrus, Sceales, Starke & Sawall

[57] ABSTRACT

A magnetic head device comprises a magnetic head assembly and a holder which is inserted with the magnetic head assembly and has a generally ring shape which is electromagnetically open so as to minimize magnetic induction.

3 Claims, 3 Drawing Sheets

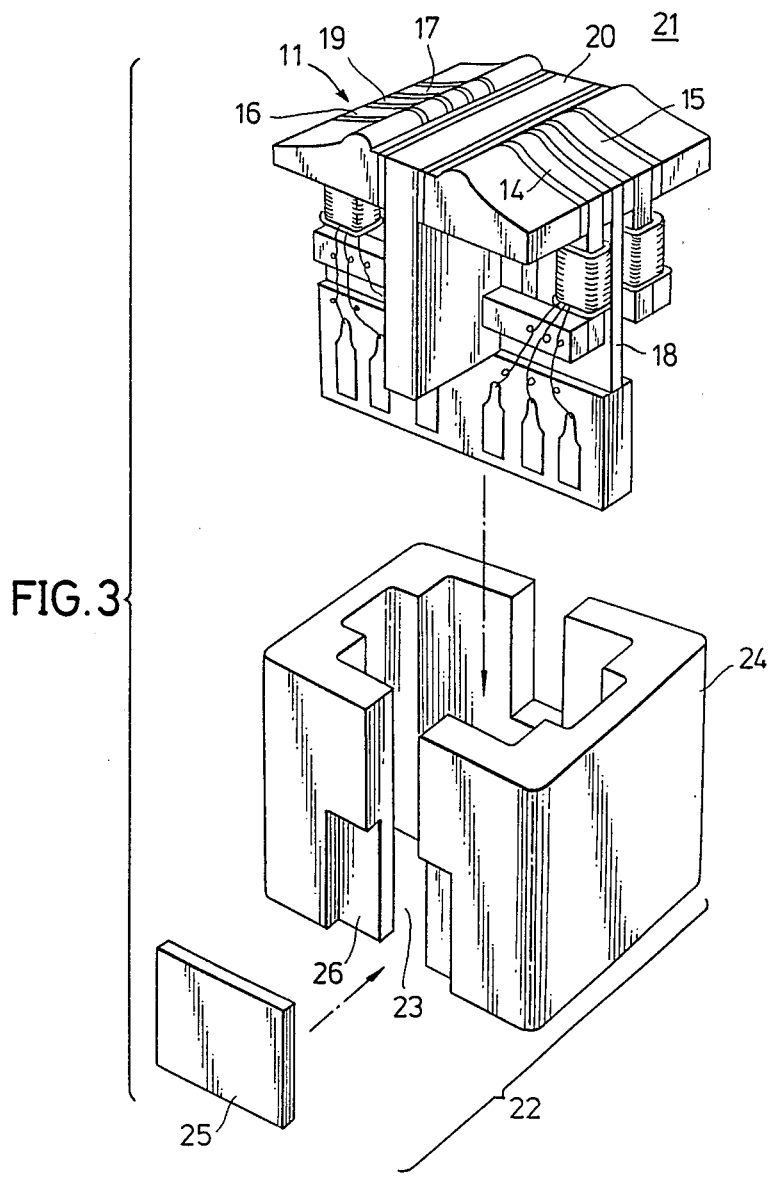

MAGNETIC HEAD DEVICE HAVING A HOLDER WITH A GENERALLY RING SHAPE WHICH IS ELECTROMAGNETICALLY OPEN

BACKGROUND OF THE INVENTION

The present invention generally relates to magnetic head devices, and more particularly to a magnetic head device having a satisfactory feedthrough characteristic and is suited for use in a cassette tape streaming device and the like.

A cassette tape streaming device records on a cassette tape data which are pre-recorded on a rigid disc so as to function as a back-up system for a rigid disc drive which plays the rigid disc. In a case where the pre-recorded data on the rigid disc are erased erroneously, for example, the cassette tape streaming device is used to transfer the recorded data on a magnetic tape of the cassette tape to the rigid disc drive at a high speed.

As will be described later on in the specification in conjunction with drawings, the cassette tape streaming device is provided with a conventional magnetic head device comprising a magnetic head assembly and a holder made of a non-magnetic metal such as brass. The magnetic head assembly is fixedly inserted into the holder.

The magnetic head assembly integrally comprises a pair of write heads, a pair of read heads, channel shields, and a center shield. Since the write heads and the read heads are provided close to each other, the so-called feedthrough (magnetic induction) easily occurs between the corresponding write and read heads. The magnetic induction deteriorates the signal reproducing characteristic of the read heads, and it is thus desirable that the magnetic induction in the magnetic head device having such a construction is small. The center shield is provided so as to suppress the magnetic induction.

However, as will be described later, there is a problem in that it is difficult to obtain a satisfactory feedthrough characteristic in the conventional magnetic head device due to the construction thereof.

SUMMARY OF THE INVENTION

Accordingly, it is a general object of the present invention to provide a novel and useful magnetic head device in which the problems described heretofore are eliminated.

Another and more specific object of the present invention is to provide a magnetic head device comprising a magnetic head assembly and a holder which is inserted with the magnetic head assembly and has a generally ring shape which is electromagnetically open. According to the magnetic head device of the present invention, no eddy current circulates within the holder, and it is therefore possible to obtain a satisfactory feedthrough characteristic.

Other objects and further features of the present invention will be apparent from the following detailed description when read in conjunction with the accompanying drawings.

BRIEF DESCRIPTION OF THE DRAWINGS

FIG. 3 is a disassembled perspective view showing an embodiment of the magnetic head device according to the present invention;

DETAILED DESCRIPTION

Figure 1:
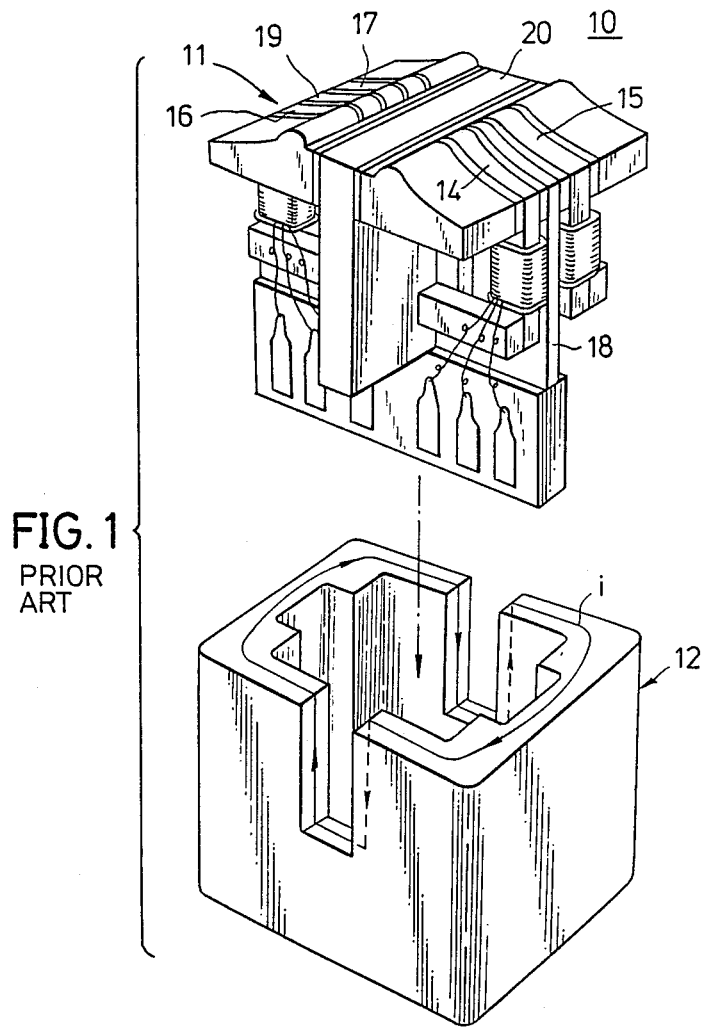
FIG. 1 is a disassembled perspective view showing an example of the conventional magnetic head device.

FIG. 1 shows an example of the conventional magnetic head device. A magnetic head device 10 comprises a magnetic head assembly 11 and a holder 12 which is made of a non-magnetic material such as brass. The magnetic head assembly 11 is fixedly inserted into the holder 12. For example, the magnetic head device 10 is provided in a cassette tape streaming device (not shown) described before.

The magnetic head assembly 11 integrally comprises a pair of write heads 14 and 15, a pair of read heads 16 and 17, channel shields 18 and 19, and a center shield 20. Since the write heads 14 and 15 and the read heads 16 and 17 are provided close to each other, the so-called feedthrough (magnetic induction) easily occurs between the corresponding write and read heads. The magnetic induction deteriorates the signal reproducing characteristic of the read heads, and it is thus desirable that the magnetic induction in the magnetic head device having such a construction is small. The center shield 20 is provided so as to suppress the magnetic induction.

The present inventor has made trial manufacture and appraisal of the magnetic head device having the construction described above, and have found the following with regard to the feedthrough characteristic.

(1) The feedthrough is 5% to 7% before the magnetic head assembly 11 is fixedly inserted into the holder 12.

(2) The feedthrough increases to 10% to 15% which is approximately double the above feedthrough value when the magnetic head device 10 is completed by fixedly inserting the magnetic head assembly 11 into the holder 12.

Figure 2:
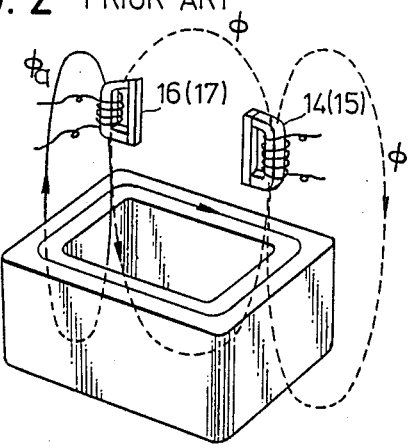
FIG. 2 is a diagram for explaining the feedthrough in the conventional magnetic head device shown in FIG. 1.

It may be regarded that the feedthrough in the magnetic head device 10 occurs for the following reasons. In FIG. 2, the write head 14 (or 15) is the generating source of the magnetic flux, and a magnetic flux $\phi$ indicated by a phantom line is generated thereby. A portion of the magnetic flux $\phi$ passes through the air and acts on a coil of the read head 16 (or 17), and a feedthrough voltage is induced thereby. In addition, another portion of the magnetic flux $\phi$ acts on the holder 12, and an eddy current is generated within the holder 12 in a direction so as to cancel this magnetic flux. Since the holder 12 has a generally ring shape which is electromagnetically closed, the generated eddy current flows in a loop i along the holder 12 as indicated by a solid line. A magnetic flux $\phi_a$ is newly generated due to this eddy current which flows in the loop i, and this magnetic flux $\phi_a$ acts on the coil of the read head 16 (or 17) to additionally induce a feedthrough voltage.

It may be regarded that the feedthrough characteristic of the magnetic head device 10 is poor due to the fact that the holder 12 is made of a metal and that the holder 12 has the generally ring shape which is electromagnetically closed.

However, the function of the holder 12 is to shield the magnetic head assembly 11, and it is essential that the holder 12 is made of a non-magnetic metal.

Accordingly, the present invention provides a magnetic head device in which the problems described heretofore are eliminated by obtaining a satisfactory feedthrough characteristic without deteriorating the shielding function of the holder.

Figure 4:
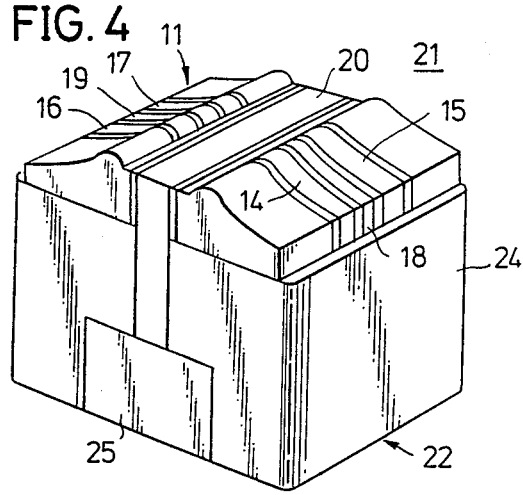
FIG. 4 is a perspective view showing the magnetic head shown in FIG. 3.
Figure 5:
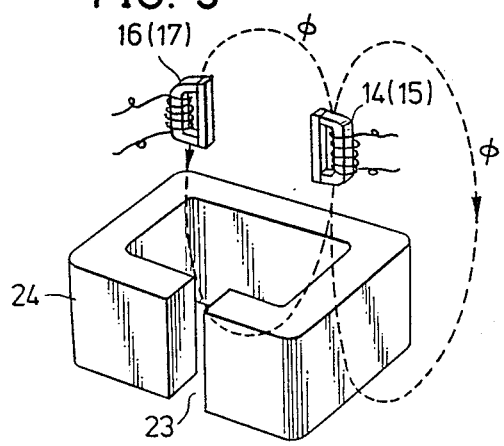
FIG. 5 is a diagram for explaining the feedthrough in the magnetic head device shown in FIGS. 3 and 4.

Next, description will be given with respect to an embodiment of the magnetic head device according to the present invention by referring to FIGS. 3 through 5. In FIGS. 3 through 5, those parts which are the same as those corresponding parts in FIGS. 1 and 2 are designated by the same reference numerals, and description thereof will be omitted.

A magnetic head device 21 comprises the magnetic head assembly 11 and a holder 22 which constitutes an essential part of the present invention. The magnetic head assembly 11 is fixedly inserted into the holder 22. For example, the magnetic head device 22 is provided in the cassette tape streaming device described before.

The holder 22 comprises a main holder body 24 and a reinforcing plate (member) 25. The main holder body 24 is made of a non-magnetic material such as brass and has a generally C-shape which is electromagnetically open due to the formation of a slit 23 which extends for the entire width of the main holder body 24. The reinforcing plate 25 is made of a non-conductive material such as a synthetic resin and is adhered on the main holder body 24 across the slit 23. In other words, the holder 22 as a whole has a generally ring shape which is electromagnetically open.

The write head 14 (or 15) generates the magnetic flux $\phi$ indicated by a phantom line in FIG. 5. A portion of the magnetic flux $\phi$ acts on the main holder body 24 and an eddy current is generated in a portion of the main holder body 24, but the eddy current is prevented from flowing in a loop at the slit 23 because the main holder body 24 has the generally C-shape which is electromagnetically open. Hence, the eddy current does not flow in the loop i described before in conjunction with FIG. 2, and the magnetic flux $\phi_a$ described before is not generated according to the present embodiment. Hence, only a portion of the magnetic flux $\phi$ generated by the write head 14 (or 15) acts on the coil of the read head 16 (or 17). As a result, the feedthrough of the magnetic head device 21 is approximately 5% to 7% which is the same as the feedthrough obtained before the magnetic head assembly 11 is fixedly inserted into the holder 22, and the feedthrough characteristic of the magnetic head device 21 is superior compared to that of the conventional magnetic head device 10 described before.

In the present embodiment, a depression 26 is formed in the main holder body 24 in a vicinity of the slit 23, and the reinforcing plate 25 is embeddedly fixed in the depression 26. However, the reinforcing plate 25 may be omitted in the case where the main holder body 24 has a sufficient strength. In this case, the holder 22 as a whole simply has a generally C-shape.

The slit 23 may be formed at a position of the main holder body 24 other than that shown in FIG. 3, as long as the main holder body 24 has a generally C-shape which is electromagnetically open at the slit 23.

As described heretofore, the eddy current will not circulate within the holder 22 according to the magnetic head device 21 of the present invention, and it is therefore possible to obtain a satisfactory feedthrough characteristic without being affected by the holder 22.

Further, the present invention is not limited to these embodiments, but various variations and modifications may be made without departing from the scope of the present invention.

What is claimed is:

1. A magnetic head device comprising:
   a magnetic head assembly comprising a write head, a read head and a center shield which is provided between said write head and said read head to suppress a magnetic induction between said write head and said read head; and
   a holder having upper and lower ends and a bore which extends between said upper and lower ends, said magnetic head assembly being partly inserted into said bore to cover said upper end, said holder comprising a single holder body which is made of a non-magnetic metal and has a generally C-shaped cross-section so that a slit is formed to extend between said upper and lower ends, and a reinforcing member which is made of non-conductive material with respect to an electric current and is mounted on said single holder body across said slit whereby eddy currents are prevented from flowing in a loop circumscribing said magnetic head assembly.

2. A magnetic head device as claimed in claim 1 in which said main holder body has a depression in a vicinity of said slit, and said reinforcing member is embeddedly fixed in said depression.

3. A magnetic head device as claimed in claim 1 in which said holder is made of brass.

* * * * *